Nov. 20, 1934.    G. C. GOECKELER, JR    1,981,503
APPARATUS FOR BANDING SLICED BREAD
Filed Oct. 6, 1932    2 Sheets-Sheet 2
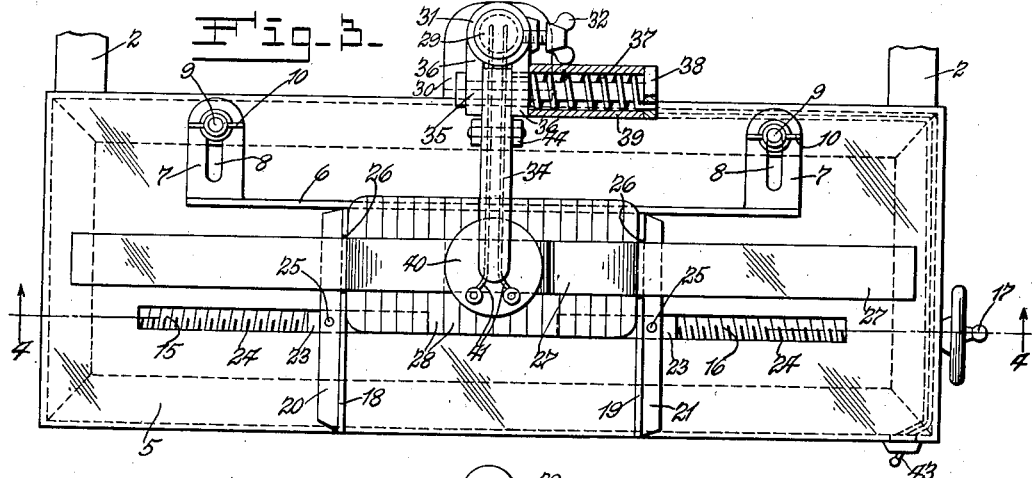
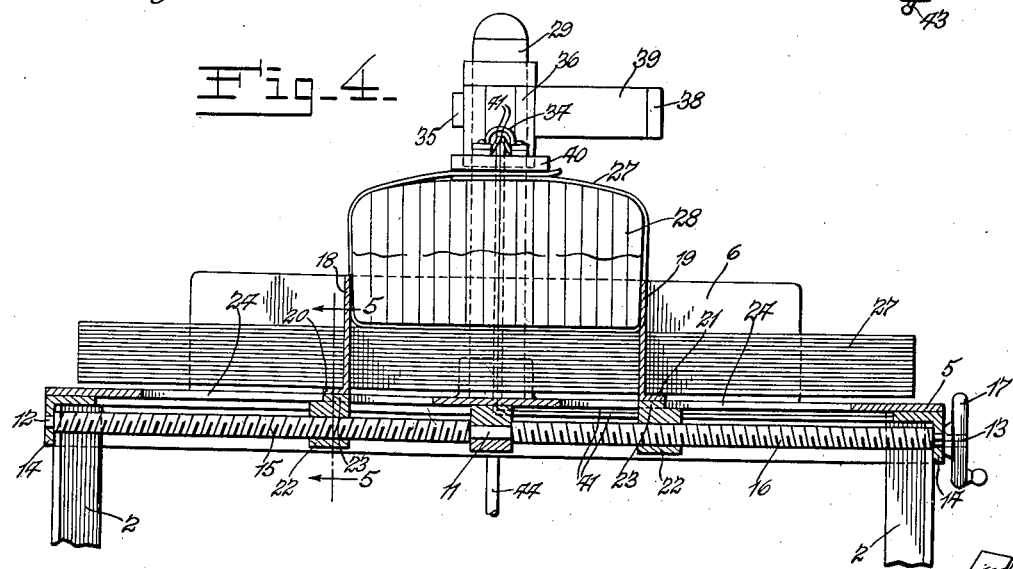
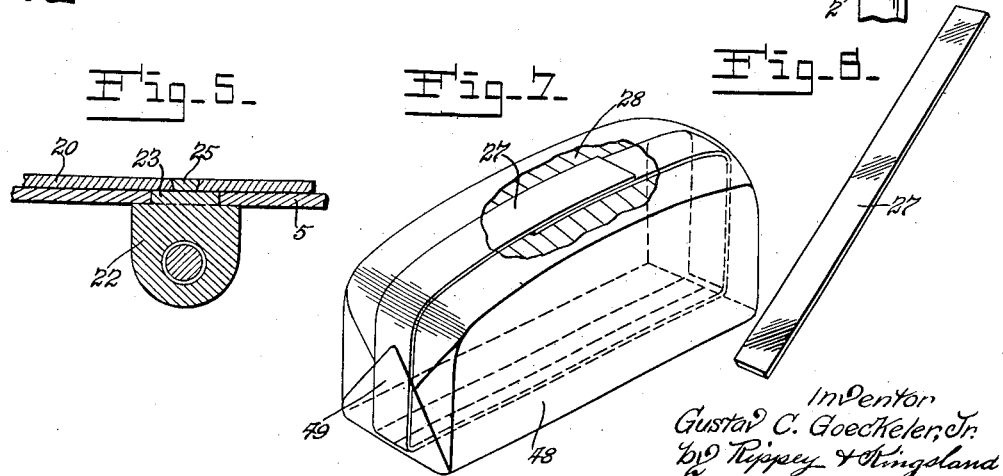
Inventor
Gustav C. Goeckeler, Jr.
by Rippey & Kingsland
His Attorneys.

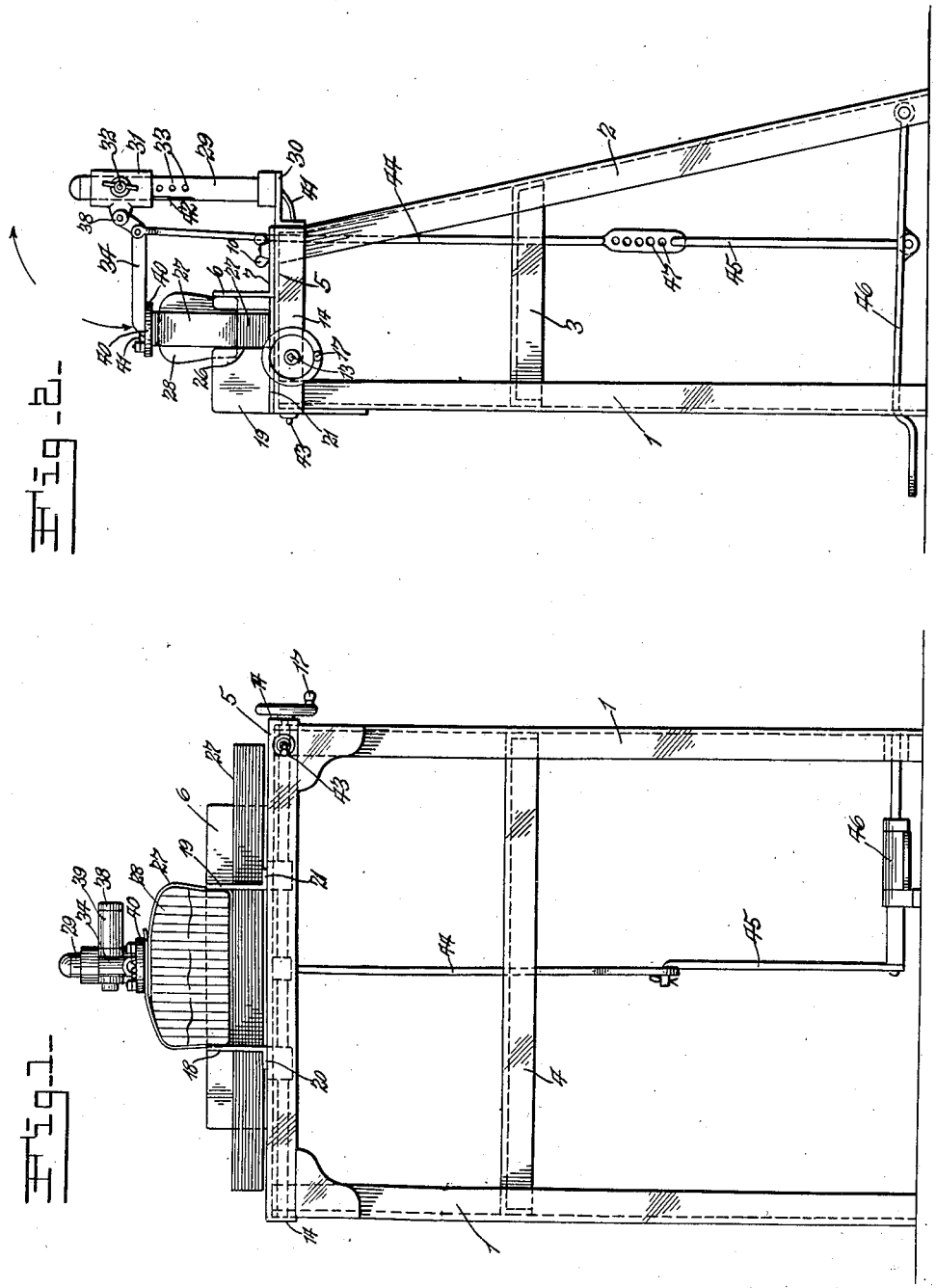

Patented Nov. 20, 1934

1,981,503

UNITED STATES PATENT OFFICE 1,981,503

APPARATUS FOR BANDING SLICED BREAD

Gustav C. Goeckeler, Jr., Columbia, Ill.

Application October 6, 1932, Serial No. 636,524

12 Claims. (Cl. 93—2)

This invention relates to an apparatus for banding sliced bread.

The preparation for sale of baked loaves of sliced bread is a known practice. The preparation of the loaves of sliced bread for delivery and sale has been attended by some difficulty and considerable expense due to the fact that the methods and apparatus heretofore used for packaging the sliced loaves, or holding the slices of the respective loaves in proper assembled relationship, have not been highly efficient. On the contrary, the practice and work of packaging the sliced loaves or holding the slices of the respective loaves in proper assembled relationship has been slow and, therefore, unduly expensive; and no efficient apparatus for this work has been provided.

My present invention comprises an apparatus for banding sliced loaves of bread and for holding the slices of the respective loaves in proper assembled relationship during the application of the bands to the respective loaves. According to the present invention, a transversely sliced loaf is placed upon a band extending longitudinally under the loaf and the extended ends of the band are manually folded against the ends and across the top and in superimposed relationship upon the top of the transversely sliced loaf. I utilize mechanical means for holding the slices of the loaf in proper longitudinal alinement, so that the sliced surfaces of the different slices are in contact and the edges of the different slices do not extend beyond each other or become disalined. While the slices of the loaf are thus mechanically held in alinement and proper relationship, the band is folded upwardly against the ends and inwardly across the top of the slices of the loaf and placed in superimposed relationship. The band comprises a strip of paper preferably provided with a coating of paraffin, or equivalent substance. While the ends of the band are thus overlapped, the heating unit of the apparatus is operated and brought into contact for a very short duration of time with the uppermost layer of the overlapping end portions of the band.
Thereby the coating is rendered viscid to such an extent that a strong adhesive union is obtained between the overlapping portions of the band.

These operations are performed much faster than has been possible by existing practice, although efforts have been made to improve the art of packaging sliced loaves of bread for the market. Immediately after the overlapping ends of the band have been adhesively united in the manner indicated, the banded loaf is removed from the machine and thereafter encased in an appropriate wrapper, and is then ready for delivery.

Another object of the invention is to provide an improved apparatus or machine specially designed and adapted for use in banding sliced loaves of bread.

Various other objects and advantages of the invention will be apparent from the following description, reference being made to the annexed drawings, in which—

Fig. 1 is a front elevation of my improved banding apparatus having thereon a stack of bands and a loaf of sliced bread being banded by one of the bands.

Fig. 2 is an end elevation of the apparatus shown in Fig. 1.

Fig. 3 is a top plan view.

Fig. 4 is a longitudinal sectional view on the line 4—4 of Fig. 3.

Fig. 5 is a vertical transverse sectional view on the line 5—5 of Fig. 4.

Fig. 6 is a perspective view of my improved band.

Fig. 7 is a perspective view of a banded and encased loaf of sliced bread, a part of the wrapper being broken away to show the united ends of the band.

The apparatus shown in the drawings comprises a pair of upright end frames composed of front members 1 and rear members 2 united and strengthened by connecting end members 3 and connecting front and rear members 4. A top plate 5 is attached to the upper ends of the frame and constitutes a support for the bands and the alining devices for the sliced loaves of bread.

An upright plate 6 is mounted longitudinally upon the top plate 5 and is provided with a number of rearwardly extended arms 7 seated on the top plate 5 and each having a slot 8 therein. Guide members 9 project upwardly from rigid connection with the top plate 5 through the slots 8 and have threaded upper ends on which are screwed clamping nuts 10. These clamping nuts 10 may be screwed along the guide members 9 into and out of clamping engagement with the arms 7 in order to hold the plate 6 rigidly in any adjustment in which it may be placed, and permit movement of said plate to any required position on the top plate 5.

A shaft 11 (Fig. 4) has end portions 12 and 13 mounted for rotation in bearings in depending portions of frame members 14 rigidly attaching the upper ends of the members 1 and 2. Thus, the shaft 11 is held from longitudinal movement in either direction but is freely rotative. The shaft 11 is provided on its end portions with oppositely disposed threads 15 and 16 and the end portion 13 is equipped with a crank device 17 whereby said shaft may be rotated in either direction. A pair of upright plates 18 and 19 are mounted on the top plate 5 and extend forwardly and rearwardly at right angles to the plate 6 which extends longitudinally of said plate 5. These plates 18 and 19 have their lower edges

20 and 21 bent and extended outwardly toward the end of the top member 5 and are arranged to slide along said member. These plates 18 and 19 are operatively connected with the threaded portions 15 and 16, respectively, of the shaft 11, so that when said shaft is rotated, said plates 18 and 19 will be moved toward or away from each other, depending upon the direction of rotation of said shaft 11. A body 22 is attached to each of the plates 18 and 19 and said bodies have threaded holes therethrough screwed on the threaded portions 15 and 16, respectively, of the shaft 11. The bodies 22 operate against the under side of the top member 5. A portion 23 extends upwardly from the upper end of each of the bodies 22 into longitudinal slots 24 in the top member 5. Thus, the bodies 22 are guided in straight lines longitudinally toward and away from each other whenever the shaft 11 is rotated. The upwardly extended portions 23 of the bodies 22 have projections 25 rigidly attached to the laterally extended portions 20 and 21, respectively. Thus, the plates 18 and 19 are operatively connected with the oppositely threaded portions 15 and 16 of the shaft 11 and will be moved toward and away from each other and supported permanently in parallel relationship and at right angles to the plate 6.

Each of the plates 18 and 19 is formed with a vertical slot 26 and these slots are in longitudinal alinement and are designed and adapted to receive a stack of bands 27 extended longitudinally above the top 5 and parallel with the plate 6. The bands 27 are preferably composed of paper coated with paraffin or equivalent substance, which is smooth and dry when unheated and which becomes viscid when subjected to a considerable degree of heat above normal atmospheric temperature. A stack of these bands of less height than the plates 18 and 19 is placed longitudinally in the notches 26, so that a loaf of sliced bread 28 may be placed between the plates 18 and 19 upon the stack of bands and against the front side of the plate 6. Thus, the slices of the loaf are held in proper relationship and cannot become disalined during the banding operation.

A post 29, preferably tubular, is in rigid connection with a bracket 30 rigid with the upper end of the frame of the apparatus. A bracket 31 is mounted for vertical adjustment on the post 29 and has screwed therein a screw member 32 which may be operated to engage its inner end in any selected one of a vertical series of indentations 33 in the post 29. Thus, by releasing the screw device 32 from its engagement in any one of the indentations 33, the bracket may be moved vertically to any selected adjustment along the post 29 and then secured in such adjustment by operating the screw device 32 to engage in the adjacent detent 33. An arm 34 is attached to a pivot rod 35 mounted for rocking movements in forwardly extended arms 36 of the bracket 31. The pivot rod 35 projects laterally and is encircled by a spring 37. One end of the spring 37 is attached to the adjacent arm 36 and the opposite end of said spring is attached to the head 38 of the pivot rod 35. This spring 37 is an actuator and its energy is utilized to raise the arm 34 after each downward operation of said arm. A housing 39 encloses the spring 37.

An electric heating device 40 of known and available construction is attached to the front end of the arm 34 and is heated by electrical energy applied through an electrical circuit comprising wires 41 extending upwardly through the post 29 and thence through a slot 42 in the front side of said post and thence through an opening in the front of the bracket 31 and through the hollow arm 34 to connect with the heating device 40. These wires extend below the top 5 and the circuit through said wires is opened and closed by an electric switch 43 supported in a convenient position near the front of the apparatus.

A rod 44 has its upper end pivoted to the arm 34 and its lower end connected with the upper end of a rod 45, the lower end of which is connected with a treadle lever 46. The connection 47 between the lower end of the rod 44 and the upper end of the rod 45 constitutes means for shortening or increasing the combined lengths of the rods 44 and 45 in accordance with the position of the bracket 31 along the post 29.

In utilizing this apparatus to practice the method disclosed, the plate 6 is placed and secured in the proper position on the top member 5 in order to be engaged by the rear of the loaf of sliced bread placed upon the stack of bands 27 between the plates 18 and 19. Then the shaft 11 is rotated to move the plates 18 and 19 away from or toward each other to proper position to engage the ends of the loaf of sliced bread 28 when said loaf is placed between said plates upon the stack of bands 27 and against the alining plate 6.

Then the end portions of the uppermost band 27 are engaged manually and folded up against the ends of the loaf 28 and over against the upper side of said loaf and in overlapping relationship and are held in such overlapping relationship. The heating device 40, having been heated by electrical energy passing thereto through the closed switch 43 and the wires 41, is then operated by depressing the treadle 46 to swing the arm 34 downwardly and thereby quickly and for a moment only press the heating device 40 against the upper side of the upper overlapping end portion of the band 27. This momentary application of heat to the paraffin coated band renders the paraffin viscid and establishes an adhesive union between the overlapping end portions of the band 27. These operations are quickly performed and the heating device is held in contact with the band only for an instant. When pressure is removed from the treadle 46, the spring 37 immediately operates to raise the arm 34 and thereby raise the heating device 40 from contact with the band 27. The operation of banding the loaf of sliced bread is now complete.

Then the banded loaf of sliced bread is removed from the machine and is enclosed and encased in a wrapper 48, the end portions 49 of which are adhesively attached in proper folded relationship so as to hold the wrapper closely around the loaf 28. The bread is now completely packaged and ready for delivery.

It is now apparent that this invention obtains all of its intended objects and purposes efficiently and satisfactorily and meets an existing and well known need and requirement for the reduction of cost of packaging sliced bread. The apparatus and the method, and also the band, may be varied within the scope of equivalent limits without departure from the nature and principle of the invention.

I claim:

1. An apparatus of the character described comprising a support, a pair of spaced supporting members mounted on said support and having spaces adapted to receive a band extending longitudinally above said support, and an alining member mounted longitudinally upon and extending above said support at right angles to said supporting members.

2. An apparatus of the character described comprising a support, a pair of spaced supporting members mounted on said support and having spaces adapted to receive a band extending longitudinally above said support, an alining member mounted longitudinally upon and extending above said support at right angles to said supporting members, and means for simultaneously moving said supporting members to vary their spaced relationship.

3. An apparatus of the character described comprising an alining member, supporting members mounted at right angles to said alining member and having spaces adapted to receive an extended band to be folded around a loaf of bread placed between said supporting members and against said alining member, and a heating device movable into contact with an end of said band when said band is folded around the loaf of bread for the purpose indicated.

4. An apparatus of the character described comprising a stationary support, devices mounted on said support for alining and for supporting vertically the slices of a sliced loaf of bread above and on said support, means for holding a band above said support in position to be folded around the sliced loaf of bread alined and supported as aforesaid, and a heating device movable into engagement with an overlapping end of the band folded around said loaf of bread.

5. An apparatus of the character described comprising a stationary support, alining and supporting devices mounted on said support for alining and supporting the slices of a sliced loaf of bread above and on said support and for holding a band in position to be folded around the sliced loaf of bread, and mechanism for heating a portion of said band after said band has been wound around the sliced loaf of bread for the purpose stated.

6. An apparatus of the character described comprising a stationary support, means mounted on said support for holding a band in extended position above said support and for supporting a sliced loaf of bread in a relationship in which the slices are vertical, a device for alining the slices of the sliced loaf of bread, and means for effecting an adhesive union between overlapping portions of adhesive equipped portions of said band when said band is wrapped around the sliced loaf of bread.

7. An apparatus of the character described comprising a stationary support, an alining member mounted longitudinally upon and extending above said support, and a pair of spaced supporting members mounted on said support at right angles to and in front of said alining member for holding an extended adhesive equipped band approximately parallel with said alining member and for supporting between them a sliced loaf of bread against said alining member and on said band.

8. An apparatus of the character described comprising a support, an alining member mounted longitudinally upon and extending above said support, a pair of spaced supporting members mounted on said support at right angles to and in front of said alining member for holding an extended adhesive equipped band approximately parallel with said alining member and for supporting between them a sliced loaf of bread against said alining member and on said band, and a heating device movable to engage an overlapped portion of said band after said band has been folded around the sliced loaf of bread as and for the purpose herein described.

9. An apparatus of the character described comprising a stationary horizontal support, an alining member mounted longitudinally upon the rear portion of and extending above said support, a pair of spaced supporting members mounted on said support at right angles to and in front of said alining member for holding an extended adhesive equipped band approximately parallel with said alining member and for supporting between them a loaf of sliced bread against said alining member and on said band, a heating device movable to engage an overlapped portion of said band after said band has been folded around the loaf of sliced bread, manual mechanism for operating said heating device to press against an overlapped portion of said band, and means for withdrawing said heating device from said band.

10. An apparatus of the character described comprising a stationary horizontal support, an alining member mounted longitudinally upon and extending above the rear portion of said support, and a pair of spaced supporting members mounted on said support at right angles to and in front of said alining member for supporting between them a loaf of sliced bread and having vertical slots for supporting a stack of bands to be wound respectively around loaves of bread mounted between said supporting members and against said alining member.

11. An apparatus of the character described comprising a support having longitudinal slots therein, an alining member mounted longitudinally upon and extending above said support rearwardly from and parallel with said slots, a pair of spaced supporting members mounted on said support at right angles to and in front of said alining member and extending across said slots, a shaft supported for rotation below said support parallel with said slots, parts attached to said supporting members and extending through said slots respectively and being screwed on said shaft, and means for rotating said shaft to move said supporting members to different adjusted positions.

12. An apparatus of the character described comprising a support, an alining member mounted longitudinally upon and extending above said support, a pair of vertical spaced supporting members mounted on said support at right angles to and in front of said alining member and each having a vertical slot therein and said slots being spaced equidistant from said alining member, a shaft supported for rotation below said support parallel with said alining member, parts attached to said supporting members and extending through said support and screwed on said shaft for movement by said shaft to move said supporting members toward and away from and parallel with said alining member, and means for rotating said shaft to move said parts and thereby said supporting members as aforesaid.

GUSTAV C. GOECKELER, Jr.